United States Patent
Friedrich et al.

(10) Patent No.: US 7,393,887 B2
(45) Date of Patent: Jul. 1, 2008

(54) STABILIZER SYSTEM FOR STABILIZING HALOGEN-CONTAINING POLYMERS

(75) Inventors: Hans-Helmut Friedrich, Lautertal-Gadernheim (DE); Karl-Josef Kuhn, Lautertal-Gadernheim (DE); Wolfgang Wehner, Zwingenberg (DE); Thomas Hopfmann, Lorsch (DE)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 11/395,272

(22) Filed: Apr. 3, 2006

(65) Prior Publication Data

US 2006/0183830 A1  Aug. 17, 2006

Related U.S. Application Data

(63) Continuation of application No. 10/450,591, filed as application No. PCT/EP01/14290 on Dec. 5, 2001, now abandoned.

(51) Int. Cl.
*C08K 3/16* (2006.01)
*C08K 5/17* (2006.01)

(52) U.S. Cl. .................... 524/247; 524/248; 524/249; 524/250; 524/401; 524/438

(58) Field of Classification Search .............. 524/247, 524/248, 249, 250, 401, 438
See application file for complete search history.

(56) References Cited

U.S. PATENT DOCUMENTS

| | | | | |
|---|---|---|---|---|
| 3,657,183 A | * | 4/1972 | Stretanski | ............ 524/96 |
| 6,194,494 B1 | * | 2/2001 | Wehner et al. | ............ 524/100 |
| 6,497,958 B1 | * | 12/2002 | Abe et al. | ............ 428/411.1 |

* cited by examiner

*Primary Examiner*—Kriellion A Sanders
(74) *Attorney, Agent, or Firm*—Daniel Reitenbach

(57) ABSTRACT

A composition and process is disclosed for the stabilization of halogen-containing polymers. In particular, chlorine-containing polymers such as poly vinyl chloride (PVC) are stabilized by incorporating of a stabilizer mixture having at least a perchlorate salt and an alkanolamine.

20 Claims, No Drawings

STABILIZER SYSTEM FOR STABILIZING HALOGEN-CONTAINING POLYMERS

This application is a continuation of U.S. application Ser. No. 10/450,591, filed on Sep. 25, 2003 now abandoned.

The invention relates to stabilizer mixtures encompassing at least a perchlorate salt and an alkanolamine which are suitable for stabilizing halogen-containing polymers.

For example, PVC as halogen-containing polymer may be stabilized by a large number of additives. Compounds of lead, of barium, and of cadmium are particularly well suited to this purpose, but are nowadays controversial for environmental reasons or because of their heavy metal content (cf. "Kunststoffadditive" [Plastics Additives], R. Gächter and H. Müller, Carl Hanser Verlag, 3rd Edition 1989, pp. 303-311 (see also 4th Edition 2001); und "Kunststoff Handbuch PVC" [Plastics Handbook PVC], Volume 2/1, W. Becker and D. Braun, Carl Hanser Verlag, 2nd Edition, 1985, pp. 531-538and Kirk-Othmer: "Encyclopedia of Chemical Technology", 4th Edition, 1994, Vol. 12, Heat Stabilizers, pp. 1071-1091).

There is therefore a continuing search for effective stabilizers and stabilizer mixtures which are free from lead, barium and cadmium.

It has now been found that mixtures made from at least one alkanolamine of the general formula (I), and from at least one perchlorate salt, in particular alkali metal or alkaline earth metal perchlorate, are particularly highly suitable for stabilizing chlorine-containing polymers, in particular PVC.

The invention accordingly provides stabilizer mixtures comprising at least
a) one perchlorate salt and
b) one alkanolamine of the formula (I)

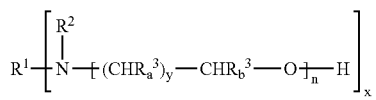

where
x=1, 2 or 3,
y=1, 2, 3, 4, 5 or 6,
n=1-10
$R^1$, $R^2$=independently H, $C_1$-$C_{22}$-alkyl, -[—(CHR$^3_a$)$_y$—CHR$^3_b$—O—]$_n$—H, -[—(CHR$^3_a$)$_y$—CHR$^3_b$—O—]$_n$—CO—$R^4$, $C_2$-$C_{20}$-alkenyl, $C_2$-$C_{18}$-acyl, $C_4$-$C_8$-cycloalkyl, which may be OH-substituted in the β position, $C_6$-$C_{10}$-aryl, $C_7$-$C_{10}$-alkaryl or $C_7$-$C_{10}$-aralkyl, or when x=1, $R^1$ and $R^2$ may additionally combine with the N to form a closed 4-10-membered ring of carbon atoms and optionally up to 2 heteroatoms, or when x=2, $R^1$ may additionally be $C_2$-$C_{18}$-alkylene which may be OH-substituted at both β-carbon atoms and/or may be interrupted by one or more O-atoms and/or one or more $NR^2$ groups, or dihydroxy-substituted tetrahydrodicyclopenta-dienylene, dihydroxy-substituted ethylcyclohexanylene, dihydroxy-substituted 4,4'-(bisphenol A dipropyl ether)ylene, isophoronylene, dimethyl-cyclohexanylene, dicyclohexylmethanylene, or 3,3'-dimethyldicyclohexylmethanylene, and if x=3, $R^1$ may also be trihydroxy-substituted (tri-N-propyl isocyanurate) triyl;
$R^3_a$, $R^3_b$=independently of one another, $C_1$-$C_{22}$-alkyl, $C_2$-$C_6$-alkenyl, $C_6$-$C_{10}$-aryl, H or $CH_2$—X—$R^5$, where X=O, S, —O—CO— or —CO—O—;
$R^4$=$C_1$-$C_{18}$-alkyl/alkenyl or phenyl, and
$R^5$=H, $C_1$-$C_{22}$-alkyl, $C_2$-$C_{22}$-alkenyl or $C_6$-$C_{10}$-aryl.

The invention further provides stabilizer mixtures comprising at least
a) one perchlorate salt and
b) one reaction product made from a mono- or polyfunctional epoxide and from ammonia or from a mono- or polyfunctional dialkyl (aryl)- or monoalkyl (aryl) amine.

Examples of the alkanolamines of the general formula (I) are compounds where $R^1$ and $R^2$=methyl, ethyl, propyl, butyl, cyclohexyl, octyl, lauryl, tetradecyl, hexadecyl, stearyl, oleyl, allyl, phenyl or benzyl, hydroxyalkyl and $R^3$=H, methyl, ethyl, propyl or butyl. Preference is given to alkanolamines where $R^1$=lauryl, tetradecyl, hexadecyl, stearyl, oleyl, where $R^2$=hydroxyalkyl. It is also possible to use ethoxylates and propoxylates of triethanol- and triisopropanolamine, or else to use fatty amines of plant or animal origin. Preference is given to trialkanolamines and mono-alkyl/alkenyl-dialkanolamines where $R^3$=H or methyl and y=1, in particular fatty amines that have been reacted twice with ethylene or with propylene oxide. Other compounds which are very highly suitable may be taken from the following list.

Methyl- or dimethylamine reacted once or twice with ethylene oxide or with propylene oxide.

Propyl- or dipropylamine reacted once or twice with ethylene oxide or with propylene oxide.

Isopropyl- or diisopropylamine reacted once or twice with ethylene oxide or with propylene oxide.

Butyl- or dibutylamine reacted once or twice with ethylene oxide or with propylene oxide.

Isobutyl- or diisobutylamine reacted once or twice with ethylene oxide or with propylene oxide.

Pentyl- or dipentylamine reacted once or twice with ethylene oxide or with propylene oxide.

Isopentyl- or diisopentylamine reacted once or twice with ethylene oxide or with propylene oxide.

Hexyl- or dihexylamine reacted once or twice with ethylene oxide or with propylene oxide.

Isohexyl- or diisohexylarnine reacted once or twice with ethylene oxide or with propylene oxide.

Heptyl- or diheptylamine reacted once or twice with ethylene oxide or with propylene oxide.

Isoheptyl- or diisoheptylamine reacted once or twice with ethylene oxide or with propylene oxide.

Octyl- or dioctylamine reacted once or twice with ethylene oxide or with propylene oxide.

Isooctyl- or diisooctylamine reacted once or twice with ethylene oxide or with propylene oxide.

Nonyl- or dinonylamine reacted once or twice with ethylene oxide or with propylene oxide.

Isononyl- or diisononylamine reacted once or twice with ethylene oxide or with propylene oxide.

Decyl- or didecylamine reacted once or twice with ethylene oxide or with propylene oxide.

Isodecyl- or diisodecylamine reacted once or twice with ethylene oxide or with propylene oxide.

Undecyl- or diundecylamine reacted once or twice with ethylene oxide or with propylene oxide.

Isoundecyl- or diisoundecylamine reacted once or twice with ethylene oxide or with propylene oxide.

Dodecyl- or didodecylamine reacted once or twice with ethylene oxide or with propylene oxide.

Isododecyl- or diisododecylamine reacted once or twice with ethylene oxide or with propylene oxide.

Tridecyl- or ditridecylamine reacted once or twice with ethylene oxide or with propylene oxide.

Isotridecyl- or diisotridecylamine reacted once or twice with ethylene oxide or with propylene oxide.

Tetradecyl- or ditetradecylamine reacted once or twice with ethylene oxide or with propylene oxide.

Hexadecyl- or dihexadecylamine reacted once or twice with ethylene oxide or with propylene oxide.

Octadecyl- or dioctadecylamine reacted once or twice with ethylene oxide or with propylene oxide.

Eicosyl- or dieicosylamine reacted once or twice with ethylene oxide or with propylene oxide.

Docosyl- or didocosylamine reacted once or twice with ethylene oxide or with propylene oxide.

N-methylbutylamine reacted with ethylene oxide or with propylene oxide.

N-ethylbutylamine reacted with ethylene oxide or with propylene oxide.

Allyl- or diallylamine reacted with ethylene oxide or with propylene oxide.

Crotyl or dicrotylamine reacted once or twice with ethylene oxide or with propylene oxide Octadecenyl- or dioctadecenylamine reacted once or twice with ethylene oxide or with propylene oxide.

Benzyl- or dibenzylamine reacted once or twice with ethylene oxide or with propylene oxide.

Cyclohexyl- or dicyclohexylamine reacted once or twice with ethylene oxide or with propylene oxide.

N-methylcyclohexylamine reacted with ethylene oxide or with propylene oxide.

N-ethylcyclohexylamine reacted with ethylene oxide or with propylene oxide.

4-Vinyl-1-cyclohexene diepoxide reacted twice with diethanol- or diisopropanolamine.

Dicyclopentadiene diepoxide reacted twice with diethanol- or diisopropanolamine.

Bisphenol A diglycidyl ether reacted twice with diethanol- or diisopropanolamine.

Trisglycidyl isocyanurate reacted three times with diethanol- or diisopropanolamine.

Preference is given to trialkanolamines and monoalkyl/alkenyldialkanolamines where $R^3_a$, $R^3_b$, independently of one another, are H or methyl, and y=1.

It has been determined that compounds of the general formula (I) where y=1-6, i.e. having up to 6 methylene groups between the amino group and the hydroxyl-substituted carbon atom, are useful as PVC stabilizer in combination with a perchlorate salt.

Also useful for the purposes of the invention are compounds of the general formula (I) where x=2, i.e. which contain two hydroxyalkylamino groups per molecule. Examples thereof include N,N,N',N'-tetrakis-(2-hydroxyethyl) ethylenediamine, N,N,N',N'-tetrakis(2-hydroxy-1-propyl)ethylenediamine, N,N,N',N'-tetrakis(2-hydroxyethyl)propylenediamine or N,N,N',N'-tetrakis(2-hydroxy-1-propyl)propylenediamine and N,N,N',N'-tetrakis(2-hydroxyethyl)hexamethylenediamine, four reactions of 1,6-hexamethylene- or 1,8-octamethylene-diamine or, respectively, neopentanediamine with ethylene oxide or with propylene oxide being preferred, or analogous reactions of bisaminomethylcyclohexane, isophoronediamine, 4,4'-diaminodicyclohexylmethane or 3,3'-dimethyl-4,4'-diaminodicyclohexylmethane.

According to the invention it is also possible to use compounds of the general formula (I) where x=3, i.e. those which have three hydroxyalkylamino groups per molecule. An example here is the product of a reaction of trisglycidyl isocyanurate with mono- or diethanol-amine or mono- or dipropanolamine.

The alkanolamines of the general formula (I) are commercially available chemicals or may be prepared by known methods, by N-alkylating a corresponding amine or ammonia (cf. Kirk-Othmer, Vol. 2, alkanolamines).

Examples of the preferred alkanolamines of the general formula (I) are tris(2-hydroxyethyl)amine, tris(2-hydroxy-1-propyl)amine, bis(2-hydroxyethyl)-2-hydroxy-1-propylamine, N-n-butyl-N,N-bis(2-hydroxyethyl)amine, N,N-bis(n-butyl)-N-(2-hydroxyethyl)amine, N-(3-n-butyloxy-2-hydroxy-1-propyl)-N,N-bis (2-hydroxyethyl)-amine, N-(1,3-dihydroxy-2-hydroxymethyl-2-propyl)-N,N-bis(2-hydroxyethyl)amine, N,N-bis(2-hydroxyethyl)-N-palmitylamine, N,N-bis(2-hydroxyethyl)-N-oleylamine, N,N-bis(2-hydroxyethyl)-N-stearylamine, N,N-bis(2-hydroxyethyl)-N-stearylamine, N-(2-hydroxyethyl)-morpholine or N-(2,3-dihydroxy-1-propyl)morpholine, bishydroxyethylpiperazine or bishydroxyisopropyl-piperazine and products of the reaction of glycidyl ethers with mono- or dialkylamine or ammonia, and also the alkanolamines derived from these, such as ethanol-amine, diethanolamine, n-propanolamine, isopropanol-amine, n-dipropanolamine or isodipropanolamine.

Very particular preference is given to addition products of olefin oxides, such as octene oxide, decene oxide, dodecene oxide, tetradecene oxide, hexadecene oxide, octadecene oxide, eicosene oxide, and docosene oxide, and also epoxystearyl alcohol with diethanol- or diisopropanolamine. These compounds having a β-positioned OH function at both ends of a relatively long alkyl chain, e.g. N-(2-hydroxyhexadecyl) diethanol-amine, N-(2-hydroxy-3-octyloxypropyl)diethanolamine, N-(2-hydroxy-3-decyloxypropyl)diethanolamine, N-(2-hydroxy-3-octyloxypropyl)diethanolamine and bis-N-(2-hydroxy-3-phenyloxypropyl)ethanolamine are particularly suitable as a component in the stabilizer systems of the invention.

The list merely gives examples and is not intended to be comprehensive.

The perchlorate salts are known to the person skilled in the art. Examples of these are those of the formula $M(ClO_4)_n$, where M is Li, Na, K, Mg, Ca, Sr, Ba, Zn, Al, La, Ce or a hydrotalcite layer-lattice cation; n is 1, 2 or 3, depending on the valency of M or, in the case of a hydrotalcite layer-lattice cation, $0 < n \leq 1$.

Use may be made of these perchlorate salts in their various commonly encountered forms, e.g. as salt or as solution in water or in an organic solvent or absorbed on a support, such as PVC, Ca silicate, zeolites or hydrotalcites. Examples of such perchlorate formulations are also perchlorate salts complexed or dissolved using alcohols (polyols, cyclodextrins) or using ether alcohols or ester alcohols or crown ether. EP 0 394 547, EP 0 457 471 and WO 94/24200 describe other embodiments.

It is preferable to use sodium-potassium perchlorate salts.

The use of defined ethanolammonium perchlorate salts for preventing discolorations of chlorine-containing resin is known from JP-A 61-9451. Concerned are perchlorate salts having an ammonium salt structure, which are obtainable by addition of primary, secondary or tertiary ethanolamines to a perchloric acid solution. Ammonium perchlorate salts are generally heat and shock sensitive compounds and therefore harbour a certain explosive risk, which makes them unsuitable for large-scale industrial applications in plastics processing.

The invention also provides combinations of the stabilizer mixtures according to the invention with at least one other conventional additive or stabilizer. The invention therefore includes combinations of the stabilizer mixtures encompassing at least one perchlorate salt and at least one compound of the general formula (I) with at least one other conventional additive or stabilizer. Preference is given to phosphites, polyols and disaccharide alcohols, glycidyl compounds, hydrotalcites, zeolites (alkali metal aluminosilicates and alkaline earth metal aluminosilicates), fillers, metal soaps, alkali metal and alkaline earth metal compounds, lubricants, plasticizers, pigments, epoxidized fatty esters and other epoxy compounds, antioxidants, UV absorbers, light stabilizers, optical brighteners and blowing agents.

Particular preference is given to epoxidized fatty acid esters and other epoxy compounds, polyols, alkaline earth metal soaps, zeolites, hydrotalcites and phosphites. Very particular preference is given to phosphites and phosphites in combination with polyols, and also to anhydrous hydrotalcites and zeolites.

The possible reaction of products of the components used are also encompassed.

Preference is also given to stabilizer mixtures which additionally comprise an enamine, an indole, or a urea. Examples of suitable compounds are 1,4-butanediol bis(β-aminocrotonate), thiodiethylene glycol bis(β-aminocrotonate), 2-phenylindole, 2-phenyllaurylindole, N,N'-diphenylthiourea. Other examples are described in the applicant's German patent application 101 07 329.

Examples of additional components of this type are listed and explained at a later stage below (cf. "Handbook of PVC Formulating" by E. J. Wickson, John Wiley & Sons, New York 1993).

Polyols and Disaccharide Alcohols

Examples of possible compounds of this type are: pentaerythritol, dipentaerythritol, tripentaerythritol, trimethylolethane, bis(trimethylolpropane), polyvinyl alcohol, bis(trimethylolethane), trimethylolpropane, sugars, sugar alcohols. Of these, preference is given to the disaccharide alcohols. It is also possible to use polyol syrups, such as sorbitol syrup, mannitol syrup and maltitol syrup. Examples of the amounts of the polyols used are from 0.01 to 20 parts by weight, advantageously from 0.1 to 20 parts by weight and in particular from 0.1 to 10 parts by weight, based on 100 parts by weight of PVC.

Glycidyl Compounds

These contain the glycidyl group

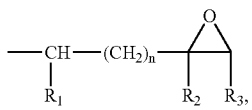

bonded directly to carbon, oxygen, nitrogen or sulphur atoms, either where both of $R_1$ and $R_3$ are hydrogen, $R_2$ is hydrogen or methyl and n=0 or where $R_1$ and $R_3$ together are —$CH_2$—$CH_2$— or —$CH_2$—$CH_2$—$CH_2$—, $R_2$ then being hydrogen and n being 0 or 1.

It is preferable to use glycidyl compounds having two functional groups. However, it is also possible in principle to use glycidyl compounds having one, three or more functional groups. Use is predominantly made of diglycidyl compounds having aromatic groups. The amounts used of the terminal epoxy compounds are preferably at least 0.1 part, preferably from 0.1 to 50 parts by weight, advantageously from 1 to 30 parts by weight and in particular from 1 to 25 parts, based on 100 parts by weight of PVC.

Hydrotalcites

The chemical composition of these compounds is known to the skilled worker, e.g. from the patents DE 3 843 581, U.S. Pat. No. 4,000,100, EP 0 062 813 and WO 93/20135. Compounds from the hydrotalcite series may be described by the following general formula

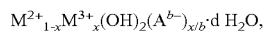

where
$M^{2+}$=one or more of the metals selected from the group consisting of Mg, Ca, Sr, Zn and Sn
$M^{3+}$=Al or B,
$A^n$ an anion of valency n,
b is a number from 1-2,
0<x<0.5,
d is a number from 0-20.

Preference is given to compounds with $A^n$=$OH^-$, $ClO_4^-$, $HCO_3^-$, $CH_3COO^-$, $C_6H_5COO^-$, $CO_3^{2-}$, $(CHOHCOO)_2^{2-}$, $(CH_2COO)_2^{2-}$, $CH_3CHOHCOO^-$, $HPO_3^-$ or $HPO_4^{2-}$;

Examples of hydrotalcites are
$Al_2O_3 \cdot 6MgO \cdot CO_2 \cdot 12H_2O$ (i), $Mg_{4.5}Al_2(OH)_{13} \cdot CO_3 \cdot 3.5H_2O$ (ii), $4MgO \cdot Al_2O_3 \cdot CO_2 \cdot 9H_2O$ (iii), $4MgO \cdot Al_2O_3 \cdot CO_2 \cdot 6H_2O$, $ZnO \cdot 3MgO \cdot Al_2O_3 \cdot CO_2 \cdot 8-9H_2O$ and $ZnO \cdot 3MgO \cdot Al_2O_3 \cdot CO_2 \cdot 5-6H_2O$. Very particular preference is given to the following types: Alkamizer 2, Alkamizer P 93-2 (from Kyowa) and L-CAM (lithium-modified hydrotalcite, from Fuji). Anhydrous hydrotalcites are preferably used.

Zeolites (aluminosilicates of alkali metals and/or of alkaline earth metals)

These may be described by the following general formula

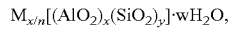

where n is the charge on the cation M;
M is an element of the first or second main group, such as Li, Na, K, Mg, Ca, Sr or Ba;
y:x is a number from 0.8 to 15, preferably from 0.8 to 1.2; and
w is a number from 0 to 300, preferably from 0.5 to 30.

Examples of zeolites are sodium aluminosilicates of the formulae
$Na_{12}Al_{12}Si_{12}O_{48} \cdot 27\ H_2O$ [zeolite A], $Na_6Al_6Si_6O_{24} \cdot 2\ NaX \cdot 7.5\ H_2O$, X=OH, halogen, $ClO_4$ [sodalite]; $Na_6Al_6Si_{30}O_{72} \cdot 24\ H_2O$; $Na_8Al_8Si_{40}O_{96} \cdot 24\ H_2O$; $Na_{16}Al_{16}Si_{24}O_{80} \cdot 16\ H_2O$;
$Na_{16}Al_{16}Si_{32}O_{96} \cdot 16\ H_2O$; $Na_{56}Al_{56}Si_{136}O_{384} \cdot 250\ H_2O$; [zeolite Y], $Na_{86}Al_{86}Si_{106}O_{384} \cdot 264\ H_2O$ [zeolite X];
or the zeolites which can be prepared by partial or complete exchange of the Na atoms by Li atoms, K atoms, Mg atoms, Ca atoms, Sr atoms or Zn atoms, for example $(Na,K)_{10}Al_{10}Si_{22}O_{64} \cdot 20\ H_2O$; $Ca_{4.5}Na_3[(AlO_2)_{12}(SiO_2)_{12}] \cdot 30\ H_2O$; $K_9Na_3[(AlO_2)_{12}(SiO_2)_{12}] \cdot 27\ H_2O$.

Very particular preference is given to Na zeolite A and Na zeolite P.

The hydrotalcites and/or zeolites may be used in amounts of, for example, 0.1 to 20 parts by weight, expediently 0.1 to 10 parts by weight and in particular 0.1 to 5 parts by weight, based on 100 parts by weight of halogen-containing polymer.

Fillers

Fillers such as Calcium Carbonate, Dolomite, wollastonite, magnesium oxide, magnesium hydroxide, silicates, china clay, talc, glass fibres, glass beads, wood flour, mica, metal oxides or metal hydroxides, carbon black, graphite, rock flour, heavy spar, glass fibres, talc, kaolin and chalk are used. Preference is given to chalk (HANDBOOK OF PVC FORMULATING E. J. Wickson, John Wiley & Sons, Inc., 1993, pp. 393-449) and reinforcing agents (TASCHEN- BUCH der Kunststoffadditive [Plastics Additives Handbook], R. Gächter & H. Müller, Carl Hanser, 1990, pp. 549-615).

The fillers may be used in amounts of preferably at least one part by weight, for example 5 to 200 parts by weight, expediently 5 to 150 parts by weight and in particular from 5 to 100 parts by weight, based on 100 parts by weight of PVC.

Metal Soaps

Metal soaps are primarily metal carboxylates, preferably of relatively long-chain carboxylic acids. Well-known examples of these are stearates and laurates, and also oleates and salts of relatively short-chain aliphatic or aromatic carboxylic acids, such as acetic acid, propionic acid, butyric acid, valeric acid, hexanoic acid, sorbic acid; oxalic acid, malonic acid, succinic acid, glutaric acid, adipic acid, fumaric acid, citric acid, benzoic acid, salicylic acid, phthalic acids, hemimellitic acid, trimellitic acid, pyromellitic acid. Metals which should be mentioned are: Li, Na, K, Mg, Ca, Sr, Ba, Zn, Al, La, Ce and rare earth metals. Use is frequently made of so-called synergistic mixtures, such as barium/zinc stabilizers, magnesium/zinc stabilizers, calcium/zinc stabilizers or calcium/magnesium/zinc stabilizers. The metal soaps may be used either alone or in mixtures. An overview of common metal soaps is found in Ullmann's Encyclopedia of Industrial Chemistry, 5th Ed., Vol. A16 (1985), pp. 361 et seq. The metal soaps or a mixture of these may be used in amounts of, for example, 0.001 to 10 parts by weight, expediently 0.01 to 8 parts by weight, particularly preferably 0.05 to 5 parts by weight, based on 100 parts by weight of PVC.

Alkali Metal and Alkaline Earth Metal Compounds

For the purposes of the present invention, these are mainly the carboxylates of the acids described above, but also corresponding oxides or, respectively, hydroxides or carbonates. Mixtures of these with organic acids are also possible. Examples are LiOH, NaOH, KOH, CaO, Ca(OH)$_2$, MgO, Mg(OH)$_2$, Sr(OH)$_2$, Al(OH)$_3$, CaCO$_3$ and MgCO$_3$ (and also basic carbonates, such as magnesia alba and huntite), and also fatty-acid salts of Na and of K. In the case of alkaline earth carboxylates and Zn carboxylates it is also possible to use adducts of these with MO or M(OH)$_2$ (M=Ca, Mg, Sr or Zn), so-called "overbased" compounds. In addition to the stabilizers according to the invention it is preferable to use alkali metal carboxylates, alkaline earth metal carboxylates and/or aluminium carboxylates.

Lubricants

Examples of possible lubricants are: montan wax, fatty acid esters, PE waxes, amide waxes, chloroparaffins, glycerol esters and alkaline earth metal soaps, and fatty ketones, and also the lubricants, or combinations of the lubricants, listed in EP 0 259 783. Calcium stearate is preferred.

Plasticizers

Examples of organic plasticizers are those from the following groups:
A) Phthalates: such as preferably di-2-ethylhexyl, diisononyl and diisodecyl phthalate, also known by the common abbreviations DOP (dioctyl phthalate, di-2-ethylhexyl phthalate), DINP (diisononyl phthalate), DIDP (diisodecyl phthalate).
B) Esters of aliphatic dicarboxylic acids, in particular esters of adipic, azelaic or sebacic acid: preferably di-2-ethylhexyl adipate and diisooctyl adipate.
C) Trimellitic esters, such as tri-2-ethylhexyl trimellitate, triisodecyl trimellitate (mixture), triisotridecyl trimellitate, triisooctyl trimellitate (mixture), and also tri-$C_6$-$C_8$-alkyl, tri-$C_6$-$C_{10}$-alkyl, tri-$C_7$-$C_9$-alkyl and tri-$C_9$-$C_{11}$-alkyl trimellitate. Common abbreviations are TOTM (trioctyl trimellitate, tri-2-ethylhexyl trimellitate), TIDTM (triisodecyl trimellitate) and TITDTM (triisotridecyl trimellitate).
D) Epoxy plasticizers: these are primarily epoxidized unsaturated fatty acids, e.g. epoxidized soybean oil.
E) Polymeric plasticizers: the commonest starting materials for preparing polyester plasticizers are: dicarboxylic acids, such as adipic, phthalic, azelaic or sebacic acid; diols, such as 1,2-propanediol, 1,3-butanediol, 1,4-butanediol, 1,6-hexanediol, neopentyl glycol and diethylene glycol.
F) Phosphoric esters: a definition of these esters is given in the abovementioned "Taschenbuch der Kunststoffadditive" ["Plastics Additives Handbook"], Chapter 5.9.5, pp. 408-412. Examples of these phosphoric esters are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to 2-triethylhexyl phosphate and Reofos® 50 and Reofos® 95 from Ciba Spezialitätenchemie.
G) Chlorinated hydrocarbons (paraffins)
H) Hydrocarbons
I) Monoesters, e.g. butyl oleate, phenoxyethyl oleate, tetrahydrofurfuryl oleate and alkylsulphonates.
J) Glycol esters, e.g. diglycol benzoates.

A definition of these plasticizers and examples for the same are given in "Kunststoffadditive" ["Plastics Additives"], R. Gächter/H. Müller, Carl Hanser Verlag, 3rd Ed., 1989, Chapter 5.9.6, pp. 412-415, and in "PVC Technology", W. V. Titow, 4th Ed., Elsevier Publ., 1984, pp. 165-170. It is also possible to use mixtures of different plasticizers. The plasticizers may be used in amounts of, for example, 5 to 20 parts by weight, expediently 10 to 20 parts by weight, based on 100 parts by weight of PVC. Rigid or semirigid PVC comprises preferably up to 10%, particularly preferably up to 5%, of plasticizer, or no plasticizer.

Pigments

Suitable substances are known to the skilled worker. Examples of inorganic pigments are TiO$_2$, pigments based on zirconium oxide, BaSO$_4$, zinc oxide (zinc white) and lithopones (zinc sulphide/barium sulphate), carbon black, carbon black-titanium dioxide mixtures, iron oxide pigments, Sb$_2$O$_3$, (Ti,Ba,Sb) 02, Cr$_2$O$_3$, spinels, such as cobalt blue and cobalt green, Cd(S,Se), ultramarine blue. Examples of organic pigments are azo pigments, phthalocyanine pigments, quinacridone pigments, perylene pigments, diketopyrrolopyrrole pigments and anthraquinone pigments. TiO$_2$ in micronized form is also preferred. A definition and further descriptions are found in the "Handbook of PVC Formulating", E. J. Wickson, John Wiley & Sons, New York, 1993.

Phosphites

Organic phosphites are known costabilizers for chlorine-containing polymers. Examples of these are trioctyl, tridecyl, tridodecyl, tritridecyl, tripentadecyl, trioleyl, tristearyl, triphenyl, trilauryl, tricresyl, tris(nonylphenyl), tris(2,4-tert-butylphenyl) and tricyclohexyl phosphite. Other suitable phosphites are various mixed aryl dialkyl or alkyl diarylphosphites, such as phenyl dioctyl, phenyl didecyl, phenyl didodecyl, phenyl ditridecyl, phenyl ditetradecyl, phenyl dipentadecyl, octyl diphenyl, decyl diphenyl, undecyl diphenyl, dodecyl diphenyl, tridecyl diphenyl, tetradecyl diphenyl, pentadecyl diphenyl, oleyl diphenyl, stearyl diphenyl and dodecyl bis(2,4-di-tert-butylphenyl) phosphite. Advantageous use may also be made of phosphites of various di- or polyols: e.g. tetraphenyldipropylene glycol diphosphite, polydipropylene glycol phenyl phosphite, tetraisodecyl dipropylene glycol diphosphite, tris(dipropylene glycol) phosphite, tetramethylolcyclohexanol decyl diphosphite, tetramethylolcyclohexanol butoxyethoxyethyl diphosphite, tetramethylolcyclohexanol nonylphenyl diphosphite, bis(nonylphenyl) di(trimethylolpropane) diphosphite, bis(2-butoxyethyl) di(trimethylolpropane) diphosphite, tris(hydroxyethyl) isocyanurate hexadecyl triphosphite, didecyl pentaerythrityl diphosphite, distearyl pentaerythrityl diphosphite, bis(2,4-di-tert-butylphenyl) pentaerythrityl diphosphite, and also mixtures of these phosphites and aryl/alkyl phosphite mixtures of empirical composition $(H_{19}C_9-C_6H_4O)_{1.5}P(OC_{12,13}H_{25,27})_{1.5}$ or $[C_8H_{17}-C_6H_4-O-]_2P[i-C_8H_{17}O]$, $(H_{19}C_9-C_6H_4O)_{1.5}P(OC_{9,11}H_{19,23})_{1.5}$. Example amounts of the organic phosphites used are from 0.01 to 10, advantageously from 0.05 to 5 and in particular from 0.1 to 3 parts by weight, based on 100 parts by weight of PVC.

Epoxidized Fatty Acid Esters and other Epoxy Compounds

The stabilizer combination of the invention may additionally and preferably comprise at least one epoxidized fatty acid ester. Possible compounds here are especially esters of fatty acids from natural sources (fatty acid glycerides), such as soya oil or rapeseed oil. However, it is also possible to use synthetic products, such as epoxidized butyl oleate. Use may also be made of epoxidized polybutadiene and polyisoprene, if desired also in a partially hydroxylated form, or of glycidyl acrylate and glycidyl methacrylate as homo- or copolymer. These epoxy compounds may also have been applied to an alumino salt compound; in this connection see also DE-A-4 031 818.

Antioxidants

Alkylated monophenols, e.g. 2,6-di-tert-butyl-4-methylphenol, alkylthiomethylphenols, e.g. 2,4-dioctylthiomethyl-6-tert-butylphenol, alkylated hydroquinones, e.g. 2,6-di-tert-butyl-4-methoxyphenol, hydroxylated thiodiphenyl ethers, e.g. 2,2'-thiobis(6-tert-butyl-4-methylphenol, alkylidenebisphenols, e.g. 2,2'-methylenebis(6-tert-butyl-4-methylphenol), benzyl compounds, e.g. 3,5,3', 5'-tetratert-butyl-4,4'-dihydroxydibenzyl ether, hydroxybenzylated malonates, e.g. dioctadecyl 2,2-bis(3,5-di-tert-butyl-2-hydroxybenzyl) malonate, hydroxybenzyl aromatics, e.g. 1,3,5-tris(3,5-di-tert-butyl-4-hydroxybenzyl)-2,4,6-trimethylbenzene, triazine compounds, e.g. 2,4-bisoctylmercapto-6-(3,5-di-tert-butyl-4-hydroxyanilino)-1,3,5-triazine, phosphonates and phosphonites, e.g. dimethyl 2,5-di-tert-butyl-4-hydroxybenzylphosphonate, acylaminophenols, e.g. 4-hydroxylauranilide, esters of beta-(3,5-ditert-butyl-4-hydroxyphenyl)propionic acid, beta-(5-tert-butyl-4-hydroxy-3-methylphenyl) propionic acid, beta-(3,5-dicyclohexyl-4-hydroxyphenyl) propionic acid, esters of 3,5-ditert-butyl-4-hydroxyphenylacetic acid with mono-or polyhydric alcohols, amides of beta-(3,5-ditert-butyl-4-hydroxyphenyl) propionic acid, such as, for example, N,N'-bis(3,5-ditert-butyl-4-hydroxyphenyl-propionyl) hexamethylenediamine, vitamin E (tocopherol) and derivatives. Examples of the amounts of the antioxidants used are from 0.01 to 10 parts by weight, advantageously from 0.1 to 10 parts by weight and in particular from 0.1 to 5 parts by weight, based on 100 parts by weight of PVC.

UV Absorbers and Light Stabilizers

Examples of these are: 2-(2'-hydroxyphenyl) benzo-triazoles, such as 2-(2'-hydroxy-5'-methylphenyl)-benzotriazole, 2-hydroxybenzophenones, esters of unsubstituted or substituted benzoic acids, such as 4-tert-butylphenyl salicylate, phenyl salicylate, acrylates, nickel compounds, oxalamides, such as 4,4'-dioctyloxyoxanilide, 2,2'-dioctyloxy-5,5'-ditert-butyloxanilide, 2-(2-hydroxyphenyl)-1,3,5-triazines, such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, sterically hindered amines, such as bis(2,2,6,6-tetramethylpiperidin-4-yl) sebacate, bis(2,2,6,6-tetramethylpiperidin-4-yl) succinate.

Blowing Agents

Examples of blowing agents are organic azo compounds and organic hydrazo compounds, tetrazoles, oxazines, isatoic anhydride, and also soda and sodium bicarbonate. Preference is given to azodicarbonamide and sodium bicarbonate and also mixtures of these.

Definitions for and examples of impact modifiers and processing aids, gelling agents, antistats, biocides, metal deactivators, optical brighteners, flame retardants, antifogging agents and compatibilizers are given in "Kunststoffadditivell" ["Plastics Additives"], R. Gächter/H. Müller, Carl Hanser Verlag, 3rd Ed., 1989, and 4th Edition, 2001, and in "Handbook of Polyvinyl Chloride Formulating" E. J. Wilson, J. Wiley & Sons, 1993, and also in "Plastics Additives" G. Pritchard, Chapman & Hall, London, 1st edition, 1998. Impact modifiers are also described in detail in "Impact Modifiers for PVC", J. T. Lutz/D. L. Dunkelberger, John Wiley & Sons, 1992.

The invention also provides compositions which comprise a chlorine-containing polymer and a stabilizer mixture of the invention.

The amounts of the compounds of the general formula (I) present for stabilization in these chlorine-containing polymer compositions are advantageously from 0.01 to 10 parts by weight, preferably from 0.05 to 5 parts by weight, based on 100 parts by weight of PVC.

Examples of the amount used of the perchlorate salts are from 0.001 to 5 parts by weight, advantageously from 0.01 to 3 parts by weight, particularly preferably from 0.01 to 2 parts by weight, based on 100 parts by weight of PVC.

Preference is given to compositions in which the ratio of the compound of the general formula (I) to the perchlorate salt, based on weight, is in the range of from 1.5:1 to 10:1.

Examples of the chlorine-containing polymers to be stabilized are: polymers of vinyl chloride, of vinylidene chloride, vinyl resins whose structure contains vinyl chloride units, such as copolymers of vinyl chloride and vinyl esters of aliphatic acids, in particular vinyl acetate, copolymers of vinyl chloride with esters of acrylic or methacrylic acid and with acrylonitrile, copolymers of vinyl chloride with diene compounds and with unsaturated dicarboxylic acids or anhydrides of these, such as copolymers of vinyl chloride with diethyl maleate, diethyl fumarate or maleic anhydride, postchlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers of the same with vinyl chloride and with other polymerizable compounds; polymers of vinyl chloroacetate and of dichlorodivinyl ether; chlorinated polymers of vinyl acetate, chlorinated polymeric esters of acrylic acid and of alpha-substituted acrylic acid; polymers of chlorinated styrenes, such as dichlorostyrene; chlorinated rubbers; chlorinated polymers of ethylene; polymers and postchlorinated polymers of chlorobutadiene and copolymers of these with vinyl chloride, chlorinated natural or synthetic rubbers, and also mixtures of the polymers mentioned with themselves or with other polymerizable compounds. For the purposes of this invention, PVC includes copolymers with polymerizable compounds, such as acrylonitrile, vinyl acetate or ABS, where these may be suspension polymers, bulk polymers or else emulsion polymers. Preference is given to a PVC homopolymer, also in combination with polyacrylates.

Other possible polymers are graft polymers of PVC with EVA, ABS or MBS. Other preferred substrates are mixtures of the abovementioned homo- and copolymers, in particular vinyl chloride homopolymers, with other thermoplastic or/and elastomeric polymers, in particular blends with ABS, MBS, NBR, SAN, EVA, CPE, MBAS, PMA, PMMA, EPDM or with polylactones, in particular from the group consisting of ABS, NBR, NAR, SAN and EVA. The abbreviations used for the copolymers are familiar to the skilled worker and have the following meanings: ABS: acrylonitrile-butadiene-styrene; SAN: styrene-acrylonitrile; NBR: acrylonitrile-butadiene; NAR: acrylonitrile-acrylate; EVA: ethylene-vinyl acetate. Other possible polymers are in particular styrene-acrylonitrile copolymers based on acrylate (ASA). A preferred component in this context is a polymer composition which comprises, as components (i) and (ii), a mixture of 25-75% by weight of PVC and 75-25% by weight of the copolymers mentioned. Components of particular importance are compositions made from (i) 100 parts by weight of PVC and (ii) 0-300 parts by weight of ABS and/or SAN-modified ABS and 0-80 parts by weight of the copolymers NBR, NAR and/or EVA, but in particular EVA.

For the purposes of the present invention it is also possible to stabilize in particular recycled materials of chlorine-containing polymers, specifically the polymers described in more detail above, which have been degraded by processing, use or storage. Recycled material from PVC is particularly preferred.

The compounds which may be used concomitantly according to the invention, and also the chlorine-containing polymers, are well known to the skilled worker and are described in detail in "Kunststoffadditive" ["Plastics Additives"], R. Gächter/H. Müller, Carl Hanser Verlag, 3rd Ed., 1989; in DE 197 41 778 and in EP-A 99 105 418.0 of 17.03.1999, which are incorporated herein by way of reference.

The inventive stabilization is suitable for chlorine-containing polymer compositions that are non-plasticized or plasticizer-free or substantially plasticizer-free compositions, and also as for plasticized compositions.

The compositions of the invention are useful in particular, in the form of rigid formulations, for hollow articles (bottles), packaging films (thermoformable films), blown films, crash pad films (cars), tubes, foams, heavy profiles (window frames), translucent-wall profiles, building profiles, films (including Luvitherm films), PVC tubes, profiles, sidings, fittings, office films and equipment housings (computers and domestic appliances). Preferred other compositions, in the form of flexible formulations, are for wire sheathing, cable insulation, decoration sheeting, roofing films, foams, agricultural sheeting, hoses, sealing profiles, floorcoverings, motor vehicle parts, flexible films, injection mouldings, office films and films for air halls. Examples of the use of the compositions according to the invention as plastisols are synthetic leather, floorings, textile coatings, wallcoverings, coil coatings and underfloor sealing for motor vehicles.

Examples of sintered PVC applications of the compositions according to the invention are slush, slush mould and coil coatings and also in E-PVC for Luvitherm films.

The stabilizers may advantageously be incorporated by the following methods: as emulsion or dispersion (one possibility is, for example, the form of a pasty mixture, an advantage of the combination of the invention in the case of this administration form is the stability of the paste); as a dry mixture during the mixing of added components or polymer mixtures; by direct addition into the processing apparatus (e.g. calender, mixer, kneader, extruder or the like) or as a solution or melt or, respectively, as flakes or pellets in a dust-free form as one-pack.

The PVC stabilized according to the invention, which is also provided by the invention, may be prepared in a manner known per se, by using equipment known per se, such as the abovementioned processing apparatus, to mix the stabilizer mixture of the invention and, if desired, other additives, with the PVC. The stabilizers here may be added individually or in a mixture, or else in the form of what are known as masterbatches. The PVC stabilized as in the present invention may be brought into the desired shape in a known manner. Examples of processes of this type are grinding, calendering, extruding, injection moulding and spinning, and also extrusion blowmoulding. The stabilized PVC may also be processed to give foams. The invention therefore also provides a process for stabilizing chlorine-containing polymers by adding of the stabilizer mixture according to the invention to a chlorine-containing polymer, and also provides products comprising PVC stabilized by the stabilizer mixture according to the invention.

A PVC stabilized according to the invention is, for example, particularly suitable for hollow articles (bottles), packaging films (thermoformed films), blown films, pipes, foams, heavy profiles (window frames), translucent-wall profiles, construction profiles, films (including Luvitherm films), PVC tubes, profiles, sidings, fittings, office sheeting and apparatus housings (computers, household devices). The PVC of the invention is suitable particularly for semirigid and flexible formulations, especially in the form of flexible formulations for wire sheathing, cable insulation, floorcoverings, wallcoverings, motor vehicle parts, flexible films, injection mouldings or hoses which are particularly preferred. In the form of semirigid formulations the PVC of the invention is particularly suitable for decorative films, foams, agricultural films, hoses, sealing profiles and office films. Examples of the use of the PVC according to the invention as plastisol are synthetic leather, floor coverings, textile coatings, wall coverings, coil coatings and underfloor sealing for motor vehicles.

Examples of sintered PVC applications of the PVC stabilized according to the invention are slush, slush mould and coil coatings for plastisol, semirigid and flexible formulations. For more detail in this connection see "Kunststoffhandbuch PVC" ["Plastics Handbook PVC"], Vol. 2/2, W. Becker/ H. Braun, 2nd Ed., 1985, Carl Hanser Verlag, pp. 1236-1277.

The examples below illustrate the invention but do not restrict the same. As in the remainder of the description, parts and percentages given are based on weight.

EXAMPLE 1

A dry mixture composed of

| | | |
|---|---|---|
| 100.0 parts | of Evipol[1] SH 5730 = PVC K value 57 | |
| 5.0 parts | of Paraloid[2] BTA III N 2 = MBS (methylmethacrylate-butadiene-styrene) modifier | |
| 0.5 part | of Paraloid[2] K 120 N = acrylate processing aid | |
| 0.5 part | of Paraloid[2] K 175 = acrylate processing aid | |
| 0.3 part | of Wax E = ester wax (montan wax) (ex BASF) | |
| 1.0 part | of Loxiol ® G 16 = fatty acid partial ester of glycerol (ex Henkel) | |
| 3.0 parts | of ESO = epoxidized soybean oil | |
| 0.6 part | of 30% aqueous sodium perchlorate solution | |

[1]Trade mark of EVC
[2]Trade mark of Rohm & Haas and in each case 0.4 part of a stabilizer reported in Table 1 were rolled for 5 minutes at 180° C. on mixing rolls. The Yellowness Index (YI) was determined on the milled sheet formed according to ASTM D-1925-70. The results are reported in Table 2. Low YI values indicate good stabilization or initial colour.

TABLE 1

| Stabilizer | Formula |
|---|---|
| 1 | N—(CH$_2$—CH$_2$—OH)$_3$ |
| 2 | —[CH$_2$—N—(CH$_2$—CH$_2$—OH)$_2$]$_2$ |
| 3 | N—(CH$_2$—CH(OH)—CH$_3$)$_3$ |
| 4 | —[CH$_2$—N—(CH$_2$—CH(OH)—CH$_3$)$_2$]$_2$ |
| 5 | $^n$C$_4$H$_9$—N—(CH$_2$—CH$_2$—OH)$_2$ |
| 6 | ($^n$C$_4$H$_9$)$_2$—N—CH$_2$—CH$_2$—OH |
| 7 | $^n$C$_4$H$_9$—O—CH$_2$—CH(OH)—CH$_2$—N—(CH$_2$—CH$_2$—OH)$_2$ |
| 8 | (HO—CH$_2$)$_3$—C—N—(CH$_2$—CH$_2$—OH)$_2$ |
| 9 | Oleyl-N—(CH$_2$—CH$_2$—OH)$_2$ |
| 10 | $^n$C$_{18}$H$_{37}$—N—(CH$_2$—CH$_2$—OH)$_2$ |
| 11 | Morpholine-N—CH$_2$—CH$_2$—OH |
| 12 | Morpholine-N—CH$_2$—CH(OH)—CH$_2$—OH |
| 13 | —[CH$_2$—CH$_2$—CH$_2$—N—(CH$_2$—CH$_2$—OH)$_2$]$_2$ |
| 14 | $^n$C$_{10}$H$_{21}$—CH(OH)—CH$_2$—N—(CH$_2$—CH$_2$—OH)$_2$ |
| 15 | $^n$C$_{14}$H$_{29}$—CH(OH)—CH$_2$—N—(CH$_2$—CH$_2$—OH)$_2$ |
| 16 | $^n$C$_{12}$H$_{25}$—S—CH$_2$—CH(OH)—CH$_2$—N—(CH$_2$—CH$_2$—OH)$_2$ |
| 17 | $^n$C$_4$H$_9$—CH(C$_2$H$_5$)—CH$_2$—O—CH$_2$—CH(OH)—CH$_2$—N—(CH$_2$—CH$_2$—OH)$_2$ |
| 18 | [—(CH$_2$)$_4$—CH(OH)—CH$_2$—N—(CH$_2$—CH$_2$—OH)$_2$]$_2$ |
| 19 | [—(CH$_2$)$_2$O—CH$_2$—CH(OH)—CH$_2$—N—(CH$_2$—CH$_2$—OH)$_2$]$_2$ |
| 20 | C$_6$H$_5$—CH(OH)—CH$_2$—N—(CH$_2$—CH$_2$—OH)$_2$ |
| 21 | C$_6$H$_5$—O—CH$_2$—CH(OH)—CH$_2$—N—(CH$_2$—CH$_2$—OH)$_2$ |

TABLE 1-continued

Stabilizer Formula

22 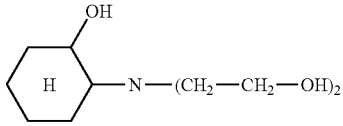

TABLE 2

| Stabilizer | YI value of milled sheet |
| --- | --- |
| Without stabilizer | 40.17 |
| 1 | 9.49 |
| 2 | 25.14 |
| 3 | 14.15 |
| 4 | 14.46 |
| 5 | 12.96 |
| 6 | 12.80 |
| 7 | 12.96 |
| 8 | 16.41 |
| 9 | 10.94 |
| 10 | 11.02 |
| 11 | 13.79 |
| 12 | 14.29 |
| 13 | 13.92 |

It is clear that the use of alkanolamiens in combination with a sodium perchlorate formulation leads to a substantial stabilization of the chlorine-containing polymer.

EXAMPLE 2

A dry mixture composed of

| | |
| --- | --- |
| 100.0 parts | of Solvic 168 PE = PVC K value 68 |
| 2.0 parts | of calcium hydroxide |
| 0.33 part | of 30% aqueous sodium perchlorate solution |
| 0.1 part | of calcium stearate |
| 0.4 part | of Loxiole G 71 S = pentaerythritol adipate, oleic acid on a molar basis | and in each case x parts of a stabilizer reported in Table 1 were rolled for 5 minutes at 180° C. on mixing rolls. The Yellowness Index (YI) was determined on the milled sheet formed according to ASTM D-1925-70. The results are reported in Table 3. Low YI values indicate good stabilization or initial colour.

TABLE 3

| Stabilizer | X parts | YI value of milled sheet |
| --- | --- | --- |
| without stabilizer | | 45.91 |
| 1 | 0.2 | 28.88 |
| 3 | 0.2 | 27.16 |
| 5 | 0.22 | 31.15 |
| 7 | 0.31 | 31.09 |

It is clear that the use of alkanolamines in combination with a sodium perchlorate formulation leads to a substantial stabilization of the chlorine-containing polymer.

EXAMPLE 3

Static Heat Test

A dry mixture M1 composed of

| | |
| --- | --- |
| 100.0 parts | of Evipol[1] SH 5730 = PVC K value 57 |
| 5.0 parts | of Paraloid[2] BTA III N 2 = MBS (methylmethacrylate-butadiene-styrene) modifier |
| 0.5 part | of Paraloid[2] K 120 N = acrylate processing aid |
| 0.5 part | of Paraloid[2] K 175 = acrylate processing aid |
| 0.3 part | of Wax E = ester wax (montan wax) (ex BASF) |
| 1.0 part | of Loxiol ® G 16 = fatty acid partial ester of glycerol (ex Henkel) |
| 3.0 parts | of ESO = epoxidized soybean oil | and the stabilizers reported in Table 1 were rolled for 5 minutes at 180° C. on mixing rolls. Test strips of film, thickness 0.3 mm, were removed from the milled sheet formed. The film specimens were exposed to heat at 190° C. in an oven (=Mathis-Thermo-Takter). The Yellowness Index (YI) was determined at 3 minute intervals to ASTM D-1925-70. The results are reported below in Table 4. Low YI values indicate good stabilization.

TABLE 4

| Min | M1 + 0.6 part of NAP 30[4] YI value | M1 + 0.6 part of NAP 30[4] + 0.4 part of stab. 1 | M1 + 0.6 part of NAP 30[4] + 0.4 part of stab. 1 + 0.75 part of CH 300[3] |
| --- | --- | --- | --- |
| 0 | 58.12 | 9.03 | 5.57 |
| 3 | Terminated | 12.68 | 7.28 |
| 6 | | 15.62 | 9.16 |
| 9 | | 21.72 | 12.22 |
| 12 | | 33.24 | 18.55 |
| 15 | | 51.93 | 29.97 |
| 18 | | Terminated | 51.35 |

[3]Mark CH 300 = mixed aryl/alkyl phosphite (ex Crompton)
[4]NAP 30 = 30% aqueous sodium perchlorate solution It is clear that the use of alkanolamines in combination with a sodium perchlorate formulation leads to a substantial stabilization of the chlorine-containing polymer, it being possible to further enhance the stabilization by addition of the aryl/alkyl phosphite.

EXAMPLE 4

Static Heat Test

A dry mixture composed of

| | | |
|---|---|---|
| 100.0 parts | of Evipol[1] SH 7020 = PCV K value 70 | |
| 20.0 parts | of dioctyl phthalate | |
| 3.0 parts | of ESO = epoxidized soyabean oil | |
| x parts | of stabilizer 1 or 3 | |
| y parts | of 30% sodium perchlorate solution in butyldiglycol | | were rolled for 5 minutes at 180° C. on mixing rolls. Test strips of film, thickness 0.3 mm, were removed from the milled sheet formed. The film specimens were exposed to heat at 190° C. in an oven (=Mathis-Thermo-Takter). The Yellowness Index (YI) was determined at 5 minute intervals to ASTM D-1925-70. The results are reported below in Tables 5A and 5B. Low YI values indicate good stabilization.

TABLE 5A

| Min | Stabilizer 1 0.7 part YI value | NaClO$_4$ solution 0.7 part YI value | Stab. 1 = 0.5 part NaClO$_4$ solution = 0.2 part YI value |
|---|---|---|---|
| 0 | 18.83 | 8.96 | 6.03 |
| 5 | 24.23 | 9.02 | 6.58 |
| 10 | 41.72 | 24.19 | 10.08 |
| 15 | Terminated | 45.54 | 20.44 |

TABLE 5B

| Min | Stab. 3 = 0.6 part YI value | Stab. 3 = 0.6 part NaClO$_4$ solution = 0.2 part YI value |
|---|---|---|
| 0 | 25.72 | 5.71 |
| 5 | 32.13 | 6.43 |
| 10 | 55.20 | 8.65 |
| 15 | | 16.32 |

It is clear that it is only the synergistic combination of a) alkanolamine 1 or 3 and b) the sodium perchlorate formulation which leads to very good stabilization of the chlorine-containing polymer.

EXAMPLE 5

Static Heat Test

A dry mixture composed of

| | |
|---|---|
| 100.0 parts | of Evipol[1] SH 7020 = PVC with K value 70 |
| 44.0 parts | of dioctyl phthalate |
| 6.0 parts | of ESO = epoxidized soyabean oil |
| 0.26 part | of stabilizer 3 (Table 6A), stabilizer 9 (Table 6B) |
| 0.04 part | of sodium perchlorate x 1 H$_2$O |
| 0.3 part | of Loxiol ® G 71 S = pentaerythritol adipate complex ester lubricant |
| 0.2 part | of calcium stearate | and in each case 0.6 part of a phosphite as given in Tables 6A and 6B was rolled for 5 minutes at 180° C. on mixing rolls. Test film strips of thickness 0.5 mm were taken from the resultant milled sheet. The film specimens were subjected to heat in an oven (=Mathis-Thermo-Takter) at 190° C. At 3 minute intervals the Yellowness Index (YI) was determined to ASTM D-1925-70. The results are seen in the following Tables 6A and 6B.

TABLE 6A

| | Stabilizer 3 | | | | |
|---|---|---|---|---|---|
| Min | Without phosphite YI value | CH 300[3] YI value | CH 302[5] YI value | CD 37-0038[6] YI value | CH 304[7] YI value |
| 0 | 10.26 | 6.79 | 7.05 | 6.19 | 6.37 |
| 3 | 11.00 | 7.13 | 7.65 | 7.17 | 6.71 |
| 6 | 14.31 | 7.98 | 8.55 | 8.07 | 7.56 |
| 9 | 20.65 | 9.27 | 10.02 | 9.58 | 8.48 |
| 12 | 23.13 | 10.41 | 12.00 | 11.26 | 9.79 |
| 15 | 28.18 | 12.58 | 14.33 | 21.87 | 12.09 |
| 18 | 37.32 | 17.04 | 18.84 | 28.28 | 24.37 |
| 21 | 41.42 | 24.65 | 25.04 | 33.29 | 30.66 |
| 24 | | 30.85 | 31.79 | 39.44 | 36.46 |
| 27 | | 36.40 | 36.37 | | 41.41 |
| 30 | | 41.68 | 40.81 | | |

[3]Mark CH 300 = mixed aryl/alkyl phosphite (ex Crompton)
[5]Mark CH 302 = mixed alkyl nonylphenyl phosphite (ex Crompton)
[6]CD 37-0038 = propylene glycol bis(didecyl phosphite) (ex Crompton)
[7]Mark CH 304 = trisisodecyl phosphite (ex Crompton)

TABLE 6B

| | Stabilizer 9 | |
|---|---|---|
| Min | Without phosphite YI value | CH 302[5] YI value |
| 0 | 10.10 | 8.48 |
| 3 | 10.13 | 8.98 |
| 6 | 10.22 | 8.91 |
| 9 | 10.60 | 8.81 |
| 12 | 12.33 | 9.28 |
| 15 | 16.36 | 10.03 |
| 18 | 19.16 | 10.94 |
| 21 | 24.75 | 12.13 |
| 24 | 30.42 | 14.53 |
| 27 | 36.77 | 18.89 |
| 30 | 43.05 | 26.16 |

[5]Mark CH 302 = mixed alkyl nonylphenyl phosphite (ex Crompton)

It can be seen that addition of phosphites can still further raise the stabilization of the chlorine-containing polymer when alkanolamines are used in combination with a sodium perchlorate formulation.

EXAMPLE 6

Static Heat Test

A dry mixture composed of

| | |
|---|---|
| 100.0 parts | of Vinnolit H 2264 = PVC with K value 64 ex Vinnolit |
| 4.0 parts | of Kronos 2220 = titanium dioxide ex Kronos |
| 6.0 parts | of Omyalite 95 T = chalk ex Omya |
| 1.0 part | of Paraloid[2] K 125 = acrylic copolymer |
| 0.4 part | of Loxiol ® G 60 = distearyl phthalate |
| 0.2 part | of Loxiol ® G 21 = hydroxystearic acid |
| 0.6 part | of Marklube 367 = paraffin wax ex Crompton |
| 2.0 parts | of Alkamizer II = hydrotalcite ex Kyowa |
| 0.9 part | of stabilizer 1 (as in Table 1) |
| 0.1 part | of sodium perchlorate | and in each case 0.4 part of a polyol (such as penta/ dipentaerythritol or THEIC) and/or 0.6 part of CH 3003) was rolled at 180° C. for 5 minutes on mixing rolls. Test film strips of thickness 0.4 mm were taken from the resultant milled sheet. The film strips were exposed to 190° C. in an oven (=Mathis-Thermo-Takter). The Yellow Indices (YI) were determined at 3 minute intervals to ASTD 1925-70. The results are seen in Table 7.

TABLE 7

| Min | Example 6 without stab. 1 YI value | Example 6 YI value | Example 6 + pentaerythritol YI value | Example 6 + dipentaerythritol YI value | Example 6 + THEIC[8] YI value | Example 6 + CH 300[3] IY value | Example 6 + THEIC[8] + CH 300[3] YI value | Example 6 + pentaerythritol + CH 300[3] YI value |
|---|---|---|---|---|---|---|---|---|
| 0  | 20.16 | 9.36  | 8.63  | 8.89  | 8.11  | 6.48  | 6.41  | 6.22  |
| 3  | 20.59 | 9.23  | 8.80  | 9.02  | 8.56  | 6.55  | 6.45  | 6.34  |
| 6  | 24.69 | 9.57  | 9.03  | 9.37  | 8.45  | 6.66  | 6.53  | 6.41  |
| 9  | 30.83 | 11.05 | 9.49  | 10.57 | 8.84  | 7.38  | 6.79  | 6.56  |
| 12 |       | 16.31 | 12.23 | 14.47 | 10.28 | 8.97  | 7.88  | 7.64  |
| 15 |       | 24.63 | 17.25 | 21.37 | 14.22 | 11.42 | 9.51  | 9.43  |
| 18 |       | 31.60 | 23.49 | 28.24 | 18.59 | 16.04 | 12.48 | 12.56 |
| 21 |       | 36.46 | 29.65 | 32.69 | 23.74 | 21.78 | 16.25 | 16.77 |
| 24 |       | 38.99 | 32.81 | 36.87 | 27.76 | 30.50 | 22.26 | 22.85 |
| 27 |       | 40.58 | 35.24 | 39.12 | 31.24 | 36.33 | 28.03 | 28.87 |
| 30 |       | 41.61 | 37.17 | 40.36 | 33.18 | 39.40 | 32.50 | 32.20 |

[8]Trishydroxyethyl isocyanurate

It can be seen that the addition of phosphites or of polyols or combinations of these can still further raise the stabilization of the chlorine-containing polymer when using alkanolamines in combination with a sodium perchlorate formulation.

EXAMPLE 7

Pressed PVC sheet

A dry mixture composed of

| 100.0 parts | of Evipol[1] SH 7020 = PVC with K value 70 |
| 47.0 parts  | of dioctyl phthalate |
| 3.0 parts   | of ESO = epoxidized soyabean oil |
| 0.3 part    | of Loxiol ® G 71 S = pentaerythritol adipate complex ester lubricant |
| 0.1 part    | of calcium stearate |
| 0.5 part    | of 30% strength sodium perchlorate solution in butyl diglycol (except in the case of 1*) | and in each case 1.0 part of a stabilizer from Table 1 was rolled at 180° C. for 5 minutes on mixing rolls. A pressed sheet was produced from the resultant milled sheet in a preheated multisheet press. Pressed sheet thickness 2 mm, pressing time 2 minutes.

The Yellowness Index (YI) of this pressed sheet was determined to ASTM D 1925 70 and the transparency was measured in % to ASTM D 2805-80. The results are seen in Table 8.

Low YI values mean good stabilization or initial colour. High percentages mean good transparency.

TABLE 8

| | Stabilizer | | | | | | | |
|---|---|---|---|---|---|---|---|---|
| | 1* | 1 | 14 | 15 | 16 | 17 | 18 | 19 |
| YI value | 70.3 | 28.0 | 15.5 | 15.2 | 12.8 | 15.4 | 29.57 | 26.21 |
| Transparency | 80.3 | 73.2 | 97.2 | 97.5 | 97.5 | 98.1 | 86.80 | 84.28 |

TABLE 8-continued

| | Stabilizer | | | | | |
|---|---|---|---|---|---|---|
| | — | 3 | 13 | 20 | 21 | 22 |
| YI value | 58.4 | 16.59 | 25.42 | 14.2 | 14.6 | 13.4 |
| Transparency | 90.1 | 93.80 | 86.80 | 98.6 | 98.7 | 98.6 |

*Stabilizer 1 in the absence of 0.5 part of 30% strength sodium perchlorate solution It can be seen that the use of alkanolamines in combination with a sodium perchlorate formulation gives marked stabilization of the chlorine-containing polymer.

The invention claimed is:

1. A composition comprising a chlorine-containing polymer having dispersed therein a stabilizer mixture comprising:
   a) at least one perchlorate salt and
   b) one alkanolamine of the formula (I)

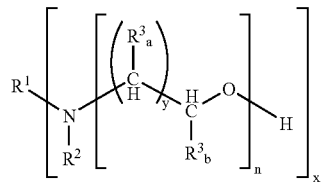

where
   x=1, 2 or 3
   y=1, 2, 3, 4, 5 or 6,
   n=1-10
   $R^1$, $R^2$= independently of one another, H, $C_1$-$C_{22}$-alkyl, —[—(CHR$^3_a$)$_y$—CHR$^3_b$—O—]$_n$—H, —[—(CHR$^3_a$)$_y$—CHR$^3_b$—O—]$_n$—CO—R$^4$, $C_2$-$C_{20}$-alkenyl, $C_2$-$C_{18}$-acyl, $C_4$-$C_8$-cycloalkyl, which may be OH-substituted in the β position, $C_6$-$C_{10}$-aryl, $C_7$-$C_{10}$-alkaryl or $C_7$-$C_{10}$-aralkyl, or when x =1, $R^1$ and $R^2$ may additionally combine with the N to form a closed 4-10-membered ring of carbon atoms and optionally up to 2 heteroatoms, or when x=2, $R^1$ may additionally be $C_2$-$C_{18}$-alkylene which may be OH-substituted at both β-carbon atoms and/or may be interrupted by one or more O-atoms and/or one or more NR$^2$ groups, or dihydroxy-substituted tetrahydrodicyclopentadienylene, dihydroxy-substituted ethylcyclo-hexanylene, dihydroxy-substituted 4,4'-(bisphenol A dipropyl ether)ylene, isophoronylene, dimethylcyclohexanylene, dicyclohexylmethanylene, or 3,3'-dimethyldicyclohexylmethanylene, and if x=3, $R^1$ may also be trihydroxy-substituted (tri-N-propyl isocyanurate)triyl;

$R^3{}_a$, $R^3{}_b$=independently of one another, $C_1$-$C_{22}$-alkyl, $C_2$-$C_6$-alkenyl, $C_6$-$C_{10}$-aryl, H or $CH_2$-X-$R^5$, where X=O, S, —O—CO— or —CO—O—;

$R^4$=$C_1$-$C_{18}$-alkyl/alkenyl or phenyl, and $R^5$=H, $C_1$-$C_{22}$-alkyl, $C_2$-$C_{22}$-alkenyl or $C_6$-$C_{10}$-aryl.

2. A composition comprising a chlorine-containing polymer and a stabilizer mixture comprising:
 a) at least one perchlorate salt and
 b) at least one product of the reaction of:
  (1) an epoxide selected from the group consisting of
   (i) monofunctional epoxides and
   (ii) polyfunctional epoxides; with
  (2) a nitrogen-containing compound selected from the group consisting of
   (i) ammonia,
   (ii) monofunctional dialkylamines,
   (iii) monofunctional diarylamines,
   (iv) polyfunctional dialkylamines,
   (v) polyfunctional diarylamines,
   (vi) monofunctional monoalkylamines,
   (vii) monofunctional monoarylamines,
   (viii) polyfunctional monoalkylamines, and
   (ix) polyfunctional monoarylarmnes.

3. The composition of claim 2 wherein the epoxide is a polyfunctional epoxide selected from the group consisting of dicyclopentadiene diepoxide, vinylcyclohexene diepoxide, bis-phenol A diglycidyl ether, and trisglycidyl isocyanurate and the nitrogen-containing compound is selected from the group consisting of diethanolamine, or diisopropanolamine, monoethanolamine, and monoisopropanolamine.

4. The composition of claim 1 wherein $R^3{}_a$ and $R^3{}_b$ are independently selected from the group consisting of hydrogen and methyl and y=1.

5. The composition of claim 1 wherein $R^1$=$R^2$=$CH_2$-$CHR^3{}_b$—OH.

6. The composition of claim 1 wherein the alkanolamine of formula (I) is selected from the group consisting of tris(2-hydroxy-1-propyl)amine, tris(2-hydroxyethyl)amine, bis(2-hydroxyethyl) (2-hydroxy-1-propyl)amine or alkyl/alkenyl-bis(2-hydroxyethyl)-amine, alkyl/alkenyl(2-hydroxy-1-propyl)amine, -(2-hydroxyhexadecyl)diethanolamine, N-(2-hydroxy-3-octyloxypropyl)diethanolamine, N-(2-hydroxy-3-decyloxypropyl)diethanolamine, and mixtures thereof.

7. The composition of claim 1 wherein the perchlorate salt is a compound of the formula $M(ClO_4)_n$, where M is Li, Na, K, Mg, Ca, Sr, Ba, Zn, Al, La, Ce or a hydrotalcite layer-lattice cation; n is 1, 2 or 3, depending on the valency of M or, in the case of a hydrotalcite layer-lattice cation, $0<n\leq1$.

8. The composition of claim 7 wherein M is Na or K and n=1.

9. The composition of claim 1 further comprising an enamine, an indole or urea.

10. The composition of claim 1 further comprising an anhydrous hydrotalcite or a zeolite.

11. The composition of claim 1 further comprising a member of the group consisting of metal soaps polyols, disaccharide alcohols, glycidyl compounds, hydrotalcites, alkali metal/alkaline earth metal aluminosilicates, alkali metal/alkaline earth metal hydroxides/oxides, or alkali metal/alkaline earth metal (hydrogen)carbonates or carboxylates, fillers, pigments, plasticizers, antioxidants, light stabilizers, optical brighteners, lubricants, and epoxidized fatty esters.

12. The composition of claim 1 further comprising at least one phosphite.

13. The composition of claim 12 wherein the phosphite is selected from the group consisting of distearyl pentaerythritol diphosphite, triphenyl phosphite, trisnonylphenyl phosphite, phenyl didecyl phosphite, polydipropylene glycol phenyl phosphite, tetraphenyl dipropylene glycol diphosphite, tetraisodecyl dipropylene glycol diphosphite, tris (dipropylene glycol) phosphite, decyl diphenyl phosphite, trioctyl phosphite, trilauryl phosphite, and or $(nonylphenyl_{1.5}\ C_{12}/C_{13}\text{-alkyl})_{1.5}$ phosphite.

14. The composition of claim 1 wherein there are from 0.01 to 10 parts by weight of the compound of the general formula (I) and from 0.001 to 5 parts by weight of the perchlorate salt and, optionally, from 0.05 to 5 parts by weight of a phosphite, per 100 parts by weight of the chlorine-containing polymer.

15. A process for stabilizing chlorine-containing polymers comprising dispersing in said chlorine-containing polymer a stabilizing amount of a mixture comprising:
 a) at least one perchlorate salt and
 b) one alkanolamine of the formula (I)

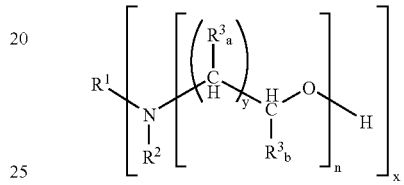

where
 x=1, 2 or 3
 y=1, 2, 3, 4, 5 or 6,
 n=1-10
 $R^1$, $R^2$= independently of one another, H, $C_1$-$C_{22}$-alkyl, —[—$(CHR^3{}_a)_y$—$CHR^3{}_b$—O—]$_n$—H, —[—(CH$R^3{}_a)_y$—$CHR^3{}_b$—O—]$_n$—CO—$R^4$, $C_2$-$C_{20}$-alkenyl, $C_2$-$C_{18}$-acyl, $C_4$-$C_8$-cycloalkyl, which may be OH-substituted in the β position, $C_6$-$C_{10}$-aryl, $C_7$-$C_{10}$-alkaryl or $C_7$-$C_{10}$-aralkyl, or when x=1, $R^1$ and $R^2$ may additionally combine with the N to form a closed 4-10-membered ring of carbon atoms and optionally up to 2 heteroatoms, or when x=2, $R^1$ may additionally be $C_2C_{18}$-alkylene which may be OH-substituted at both β-carbon atoms and/or may be interrupted by one or more O-atoms and/or one or more $NR^2$ groups, or dihydroxy-substituted tetrahydrodicyclopentadienylene, dihydroxy-substituted ethylcyclo-hexanylene, dihydroxy-substituted 4,4'-(bisphenol A dipropyl ether)ylene, isophoronylene, dimethylcyclohexanylene, dicyclohexylmethanylene, or 3,3'-dimethyldicyclohexylmethanylene, and if x=3, $R^1$ may also be trihydroxy-substituted (tri-N-propyl isocyanurate)triyl;

$R^3{}_a$, $R^3{}_b$= independently of one another, $C_1$-$C_{22}$-alkyl, $C_2$-$C_6$-alkenyl, $C_6$-$C_{10}$-aryl, H or $CH_2$-X-$R^5$, where X=O, S, —O—CO— or —CO—O—;

$R^4$=$C_1$-$C_{18}$-alkyl/alkenyl or phenyl, and $R^5$=H, $C_1$-$C_{22}$-alkyl, $C_2$-$C_{22}$-alkenyl or $C_6$-$C_{10}$-aryl.

16. The process of claim 15 wherein the chlorine-containing polymer is plasticized PVC.

17. The process of claim 15 wherein the chlorine-containing polymer is unplasticized PVC.

18. An article of manufacture comprising PVC stabilized by the process of claim 15.

19. The article of claim 18 wherein the PVC is plasticized and said article is employed in the production of flooring, of motor vehicle parts, of plasticized films, of tubing, of injection mouldings, or of wire sheathing.

20. The article of claim 18 wherein the PVC is unplasticized and said article is employed in the production of films, of PVC pipes, or of profiles.

* * * * *